Figure 1:
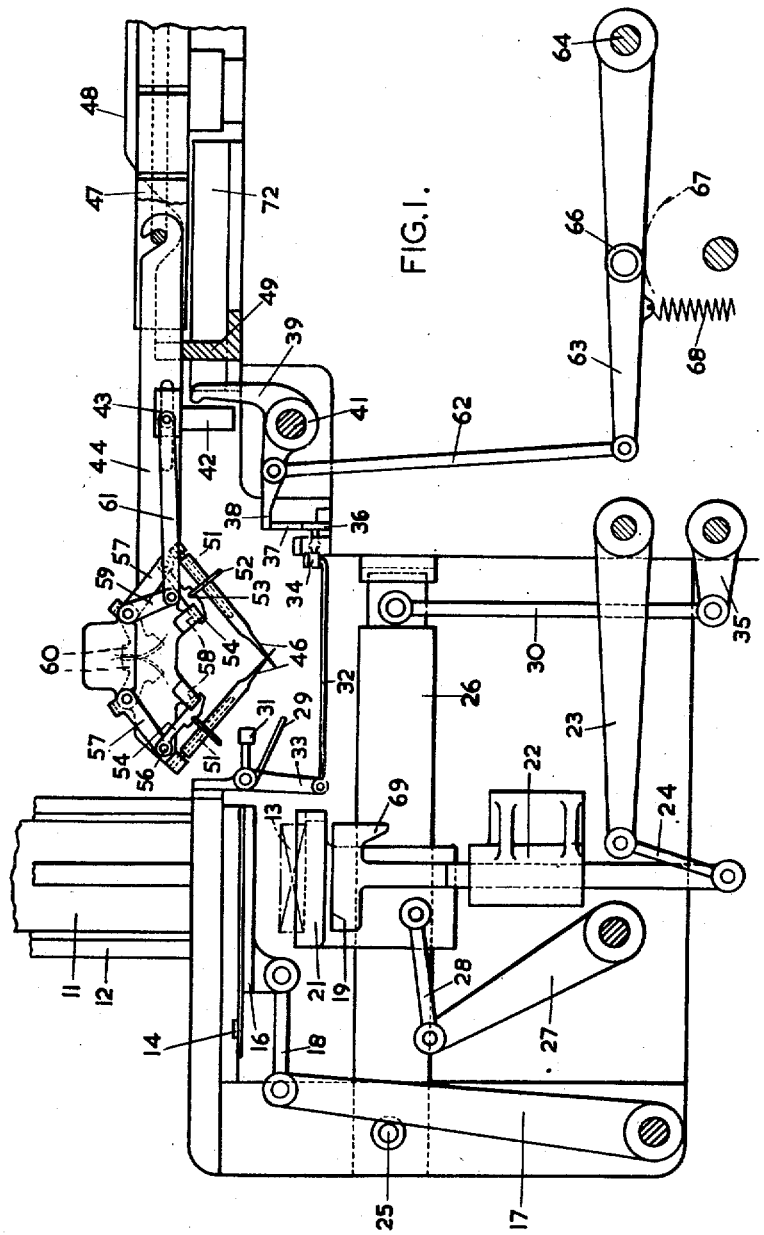

June 24, 1952 A. G. ROSE ET AL 2,601,636
APPARATUS FOR COATING AND WRAPPING ARTICLES OF PLASTIC MATERIAL
Filed Feb. 6, 1950 4 Sheets-Sheet 2

Inventors:
A.G. ROSE.
J.A. GILBERT
By
Watson, Cole, Grindle & Watson
Attorneys

June 24, 1952  A. G. ROSE ET AL  2,601,636
APPARATUS FOR COATING AND WRAPPING ARTICLES OF PLASTIC MATERIAL
Filed Feb. 6, 1950  4 Sheets-Sheet 4

Inventors:
A.G. ROSE.
J.A. GILBERT.
By
Watson, Cole, Grindle & Watson
Attorneys

Patented June 24, 1952

2,601,636

UNITED STATES PATENT OFFICE 2,601,636

APPARATUS FOR COATING AND WRAPPING ARTICLES OF PLASTIC MATERIAL

Alfred German Rose and Joseph Arthur Gilbert, Gainsborough, England, assignors to Rose Brothers (Gainsborough) Limited, Lincoln, England, a British company Application February 6, 1950, Serial No. 142,618
In Great Britain February 10, 1949

8 Claims. (Cl. 53—41)

This invention relates to apparatus for manipulating articles of plastic material, e. g., blocks of frozen ice-cream and more particularly to apparatus for passing such articles through a bath of coating liquid, e. g., chocolate, and then wrapping the coated article.

The invention is concerned with the kind of apparatus in which the articles are seized in succession by a series of spiked members which support the articles during their passage through a series of stations. The spiked members are movably mounted on supports and an actuating member is provided for moving the spiked members on their supports for the purpose of causing them to penetrate the article so as to seize it.

In such apparatus it is very desirable that the spiked members should be prevented from operating should no article be fed to the spiked members or should a damaged or incomplete article be fed.

According to the invention, there is provided an apparatus of the kind described, comprising a conveyor member adapted to feed the articles in succession towards a seizing station, a detecting device adapted to operate on each article in turn during such feeding movement in such a manner as to detect damaged or incomplete articles or absence of articles from the conveyor, and means responsive to any detecting action of said detecting device for preventing operation of the actuating member controlling the movement of the spiked members.

The spiked members may be arranged on supports pivotally mounted on and extending radially from a central rotatable member which carries the supports through various stations. In such a case, the passage of the articles through the bath of coating liquid may be brought about by causing a relative movement between the spiked member supports and the coating bath at a dipping station so as to submerge the articles in the coating liquid. Preferably, such relative movement is brought about by causing the spiked member supports to pivot downwardly at the dipping station so as to dip the articles into a stationary coating bath.

In order to prevent any spiked member from dipping into the coating bath should no article be carried by that spiked member, there is provided, according to a feature of the invention, a movable abutment under the control of the actuating member and adapted when the actuating member is in its inoperative position, i. e., when the spiked members have not been operated, to engage a stationary stop member at the dipping station which prevents dipping movement of the spiked member support. When the actuating member is moved into operative position, it moves the movable abutment clear of the stationary stop member at the dipping station and the spiked member is thus allowed to perform the dipping operation.

The movable abutment may also be used, according to a further feature of the invention, to control the operation of a wrapper feeding mechanism at a wrapping station so that no wrapper is presented in the event that no article is fed.

The detecting device is preferably provided with one or more feeler members arranged to engage each article in turn.

Figure 2:
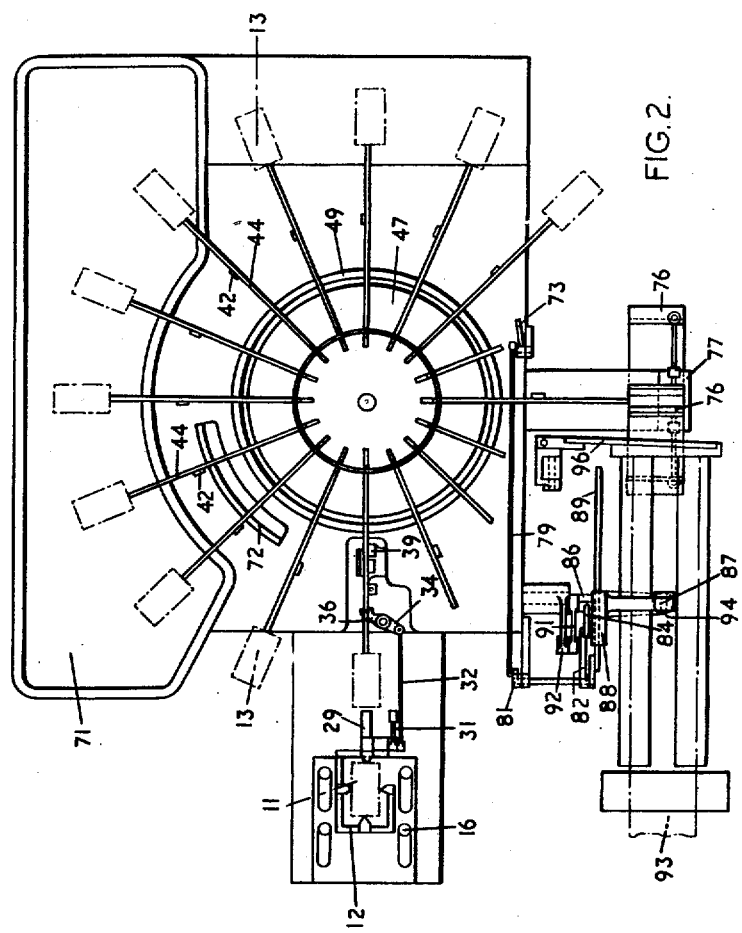
Figure 3:
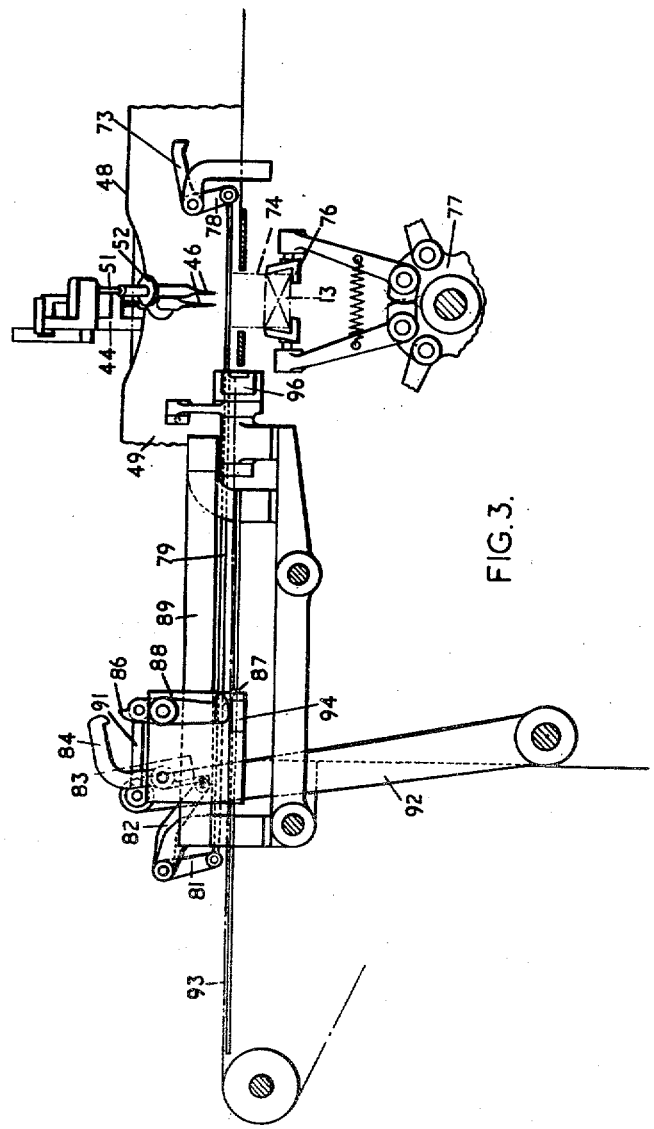
Figure 4:
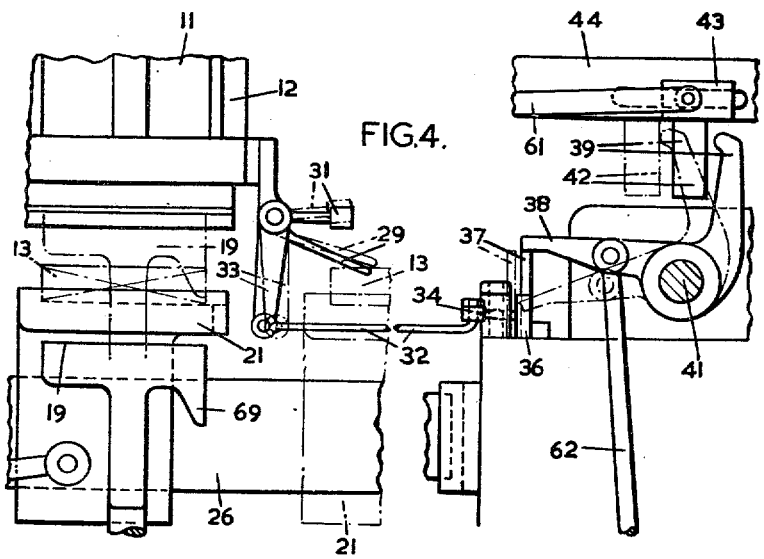
Figure 5:
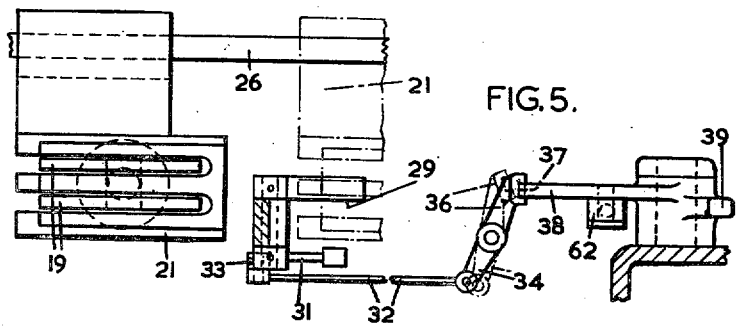
Figure 6:
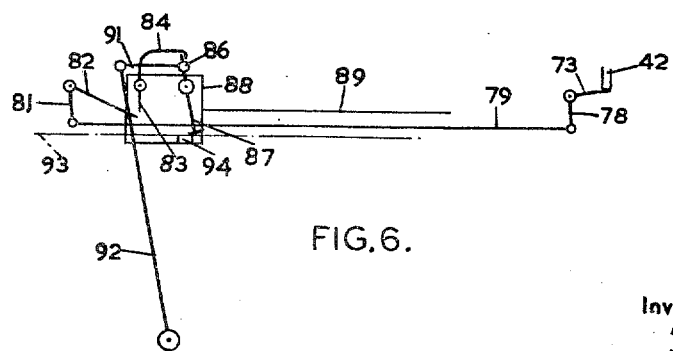

The invention has been found particularly useful in its application to apparatus for cutting, coating and wrapping blocks of ice-cream, and such an apparatus will now be described in greater detail with reference to the accompanying diagrammatic drawings, in which:

Figure 1 is an elevation of part of the apparatus showing the feeding and seizing stations and the detecting device, Figure 2 is a plan of the apparatus drawn to a somewhat smaller scale than Figure 1, Figure 3 is an elevation of part of the apparatus showing the wrapping station, Figures 4 and 5 are an elevation and plan, respectively, of the detecting device, drawn to a somewhat larger scale than Figure 1, and Figure 6 is a diagram illustrating the operation of part of the mechanism at the wrapping station.

Referring to the drawings, a supply of frozen ice-cream is contained in the form of a strip 11 in a magazine 12, and blocks 13 are cut in succession from the base of the magazine by a cutting device 14 operated by a slide 16 reciprocating movement of which is effected by a cam-operated arm 17 through a link 18. During the cutting action, the base of the strip 11 rests on a support 19 forked to pass through a slotted transfer member 21, the support 19 being slidably mounted in a bearing 22, and reciprocated in timed relationship with the operation of the cutting device by means of a cam-operated arm 23 and link 24. The cam action on the support 19 is such that, during the cutting action, the support lowers slightly to allow for the thickness of the knives of the cutting device.

As soon as the cutting action is complete, the support commences its downward movement through the transfer member 21 thus leaving the severed block 13 supported on the transfer member 21, the strip 11 being supported in the meantime by the knives of the cutting device. The transfer member is slidably mounted on a slideway 26 and is arranged to be reciprocated thereon in timed relationship with the support 19 by a cam-operated arm 27 and the link 28. After the support 19 has moved clear of the transfer member 21, the latter is moved by the arm 27 to carry the block 13 to a seizing station, and during this movement, the block 13 is acted upon by a pivoted feeler member 29 arranged normally to lie with its operative tip at a level somewhat below, say an eighth of an inch below, the upper surface of a block 13 of normal thickness. If the block 13 on the transfer member is of normal thickness, therefore, it causes the feeler to pivot upwardly, during transfer of the block, against the action of a weighted arm 31 to push a link 32 pivotally connected at one end to an arm 33 depending from the feeler 29 and at the other end to one arm 34 of a two-armed lever 34, 36 pivoted about a vertical axis. The arm 36 terminates in a stop member 37 arranged normally to lie in the path of movement of one arm 38 of a two-armed actuating member 38, 39 pivoted at 41 for movement about a horizontal axis. The other arm 39 of the actuating member is arranged, upon operation, to strike an abutment 42 depending from a block 43 slidably mounted in a slot formed in a supporting arm 44 on which are mounted a pair of spiked members 46 for seizing the block 13 at the seizing station. The actuating member 38, 39 is arranged to be pivoted by a link 62 pivotally connected at one end to the arm 38 and at the other end to an arm 63 pivoted at 64 and carrying a roller 66 arranged to bear against the surface of a rotatable cam 67, the arm 63 being urged towards the cam 67 by a spring 68. A series of supporting arms 44 extend radially from and are pivotally mounted on a central rotatable supporting member 47 which is arranged for intermittent movement to carry the blocks in succession from the seizing station, through a dipping station and to a wrapping station, the supports being arranged to slide on a cam surface 48 formed on a stationary cam member 49, the cam surface causing the arms to rise and fall to carry the block from one level to another during the course of its passage through the apparatus.

The spiked members 46 are slidably mounted on a pair of cylindrical supports 51 secured to the arms 44. The spiked members 46 are each formed with a collar 52 for engagement with a slot 53 in an actuating member 54 pivotally connected at 56 to an arm 57 and passing through a guiding slot 58 in the arm 44. The arms 57 are pivoted on the arm 44 and are formed with arcuate racks 60 arranged in engagement with each other. One arm 57 is rocked by an arm 59 pivotally attached to one end of a link 61 the other end of which is pivotally attached to the block 43.

It will thus be seen that as the abutment 42 is struck by the arm 39 after the arm 44 has reached the seizing station, the block 43 slides in the arm 44 to push the link 61 to rock the arm 59 which, in turn, pivots the adjacent arm 57 and, through the action of the rack members 58, causes the actuating members 54 to move the spiked members 46 along their supports 51 so as to penetrate the block 13.

The feeler 29 thus controls the operation of the spiked member 46. Thus, as a block 13 of normal thickness is moved towards the seizing station by the transfer member 21, the feeler is lifted and causes the stop member 37 to move out of the path of the arm 38 of the actuating member 38, 39, thus allowing the actuating member to be rocked by the cam 67 so that the arm 39 strikes the abutment 42 and operates the spiked members 46.

In the event that a block 13 is sufficiently below normal thickness to pass under the feeler 29 without disturbing it, the stop member 37 prevents operation of the actuating member 38, 39 with the result that the spiked members 46 are not operated. In such an event, the block remains on the transfer member and is swept off upon the return movement by a face 69 on the supporting member 19, which, at this stage, is in (or approaching) its supporting position below the magazine 12.

As the block is about to be moved from the transfer member by the spiked members 46, the slideway 26, which is pivoted at 25 and supported on a rod 30 connected to a cam-operated arm 35, is caused to dip slightly by the action of the cam (not shown) for the purpose of preventing any sliding action between the lower face of the block 13 and the surface of the transfer member 21. The arm 44 is then rotated to carry the block 13 through a bath 71 of coating liquid, the cam surface 48 allowing the arm 44 to dip to submerge the block. Further movement of the arm 44 then carries the coated block to a wrapping station illustrated in Figures 2 and 3. In the event that the spiked members have not been operated by the actuating member 38, 39, the abutment 42 remains in its inner position and rides on a stationary platform 72 and prevents the arm 44 from dipping, thus preventing the spiked members 46 from becoming coated with the coating material.

As the arm 44 approaches the wrapping station it passes a further feeler member 73 which, in the event that the spiked members 46 have not been operated (and there is thus no block impaled on the spiked members), is engaged by the abutment 42 and caused to pivot to prevent operation of the wrapper-feeding mechanism. When a block 13 is present, the abutment moves clear of the feeler member 73, and the wrapper-feeding mechanism, not having been interfered with, causes a wrapper 74 to be fed into position below the arm 44 at the wrapping station. As the arm 44 reaches the wrapping station, it is caused to fall so that the block 13 impaled on the spiked members 46 meets the wrapper 74 and carries it into a pocket 76 of a rotatable pocket member 77 serving to carry the block through further wrapping positions in well known manner.

The feeler 73 is formed with an arm 78 connected by a link 79 to an arm 81 secured to a pivoted stop member 82 arranged to move into or out of the path of an abutment 83 formed on a pivoted latch member 84 arranged to move into or out of the path of a catch member 86 secured to a pivoted wrapper-gripper 87. The latch member 84 and the wrapper gripper 87 are pivoted on a wrapper-feeding block 88 slidably mounted on a slideway 89 and arranged to be actuated by a link 91 pivotally attached at one end to the catch member 86 and at the other end to a cam-operated arm 92 arranged for oscillation in timed relationship with the rotatable member 47.

When a block 13 approaches the wrapping station, therefore, the feeler 73 remains inactive and the arm 92 rocks to push the block 88 through the action of the link 91 initial operation of which causes the wrapper-gripper 87 to pivot to nip a web 93 of wrapping material against an abutment 94 on the block 88 so as to feed the web forward by the amount necessary to form a wrapper 74, the web being cut to form the wrapper by a cutting device 96 after the block 88 reaches its forward position. In the event that the spiked members have not been operated (and there is thus no block to be wrapped), the abutment 42 engages the feeler 73 and causes it to operate the stop member 82 (see Figure 6) through the link 79 so as to allow the latch member 84 to move into engagement with the catch 86 thus preventing the wrapper gripper 87 from gripping the web 93. In this manner, the block 88 is moved forwardly without feeding the web.

We claim:

1. Apparatus for manipulating articles of plastic material comprising a series of spiked devices each including a movable support and a pair of spiked members movably mounted on the support and adapted to seize the articles in succession, said support being adapted to transport the articles in succession through a series of stations including a coating station, means for causing a relative movement between the coating bath and each support while the latter is at the coating station so as to cause each article to be immersed in the coating bath, an abutment movably mounted on each support and controlling the seizing action of the spiked members, an actuating member for moving the abutments on said supports, a conveyor member adapted to feed the articles in succession towards a seizing station in timed relationship with the movement of the actuating member, a detecting device adapted to operate on each article in turn during such feeding movement in such a manner as to detect damaged or incomplete articles or absence of articles from the conveyor, means responsive to any detecting action of said detecting device for preventing operation of the actuating member and thus preventing the seizing action of said spiked members, a stop member arranged at the coating station in the path of movement of said abutment when the latter is in its inoperative position so as to be engaged by said abutment and by such engagement to prevent the relative movement between the coating bath and the support, thus preventing immersion of the spiked members in the coating bath.

2. Apparatus as in claim 1, comprising means for causing the supports to pivot in succession as they reach the coating station so as to bring about the relative movement.

3. Apparatus as in claim 2, wherein the means responsive to the detecting action comprises a movable stop member controlling the action of the actuating member.

4. Apparatus as in claim 3, wherein the detecting device comprises at least one feeler member arranged to engage each article in turn.

5. Apparatus as in claim 4, wherein the conveyor comprises a reciprocating transfer member adapted to receive the articles in succession from a cutting device.

6. Apparatus as in claim 5, comprising means for removing from the transfer member any article not seized by the seizing means.

7. Apparatus for manipulating articles of plastic material comprising a series of spiked devices each including a movable support and a pair of spiked members movably mounted on the support and adapted to seize the articles in succession, said support being adapted to transport the articles in succession through a series of stations including a coating station, means for causing a relative movement between the coating bath and each support while the latter is at the coating station so as to cause each article to be immersed in the coating bath, a wrapping station at which the articles are transferred to wrapping elements, a wrapper-feeding mechanism adapted to feed a succession of wrappers into the path of movement of the articles carried by the spiked members in timed relationship with the movement of said supports so that wrapper is transferred with each article to the wrapping elements, an abutment movably mounted on each support and controlling the seizing action of the spiked members, an actuating member for moving the abutments on said supports, a conveyor member adapted to feed the articles in succession towards a seizing station in timed relationship with the movement of the actuating member, a detecting device adapted to operate on each article in turn during such feeding movement in such a manner as to detect damaged or incomplete articles or absence of articles from the conveyor, means responsive to any detecting action of said detecting device for preventing operation of the actuating member and thus preventing the seizing action of said spiked members, a stop member arranged at the coating station in the path of movement of said abutment when the latter is in its inoperative position so as to be engaged by said abutment and by such engagement to prevent the relative movement between the coating bath and the support, thus preventing immersion of the spiked members in the coating bath, and trip mechanism for controlling the wrapper-feeding mechanism, said mechanism being disposed in the path of movement of said abutment when in its inoperative position so as to be operated thereby to prevent the feeding operation of said wrapper-feeding mechanism.

8. Apparatus as in claim 7, wherein the detecting device comprises at least one feeler member arranged to engage each article in turn.

ALFRED GERMAN ROSE.
JOSEPH ARTHUR GILBERT.

REFERENCES CITED

The following references are of record in the file of this patent:

UNITED STATES PATENTS

| Number | Name | Date |
|---|---|---|
| 1,140,620 | Sector | May 25, 1915 |
| 1,886,047 | Retschen | Nov. 1, 1932 |
| 1,892,275 | Jensen | Dec. 27, 1932 |
| 1,931,787 | Borchert | Oct. 24, 1933 |